United States Patent
Midorikawa

(10) Patent No.: US 9,801,264 B2
(45) Date of Patent: Oct. 24, 2017

(54) ILLUMINATION APPARATUS AND METHOD FOR CONTROLLING THE SAME

(71) Applicant: CANON KABUSHIKI KAISHA, Tokyo (JP)

(72) Inventor: Kentarou Midorikawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/202,399

(22) Filed: Jul. 5, 2016

(65) Prior Publication Data
US 2017/0013699 A1    Jan. 12, 2017

(30) Foreign Application Priority Data

Jul. 7, 2015 (JP) ................................. 2015-136441

(51) Int. Cl.
| H05B 37/02 | (2006.01) |
| H05B 33/08 | (2006.01) |
| G03B 15/05 | (2006.01) |
| G03B 17/18 | (2006.01) |

(52) U.S. Cl.
CPC ......... *H05B 37/0272* (2013.01); *G03B 15/05* (2013.01); *G03B 17/18* (2013.01); *H05B 33/0806* (2013.01); *G03B 2215/0557* (2013.01)

(58) Field of Classification Search
CPC  H05B 37/02; H05B 37/0272; H05B 33/0806; G03B 17/18; G03B 15/05; G03B 2215/0557
See application file for complete search history.

(56) References Cited

U.S. PATENT DOCUMENTS

| 2008/0265782 A1* | 10/2008 | Crouse .................... H02J 7/345 315/158 |
| 2013/0193853 A1* | 8/2013 | Gouji ..................... H05B 37/02 315/130 |
| 2015/0091438 A1* | 4/2015 | Hessling Von Heimendahl ....... B60Q 3/0256 315/77 |
| 2015/0108895 A1* | 4/2015 | Trinschek .......... H05B 33/0803 315/86 |

FOREIGN PATENT DOCUMENTS

| JP | 2000-89307 A  | 3/2000 |
| JP | 2010-175622 A | 8/2010 |
| JP | 2013-160788 A | 8/2013 |

* cited by examiner

*Primary Examiner* — Don Le
(74) *Attorney, Agent, or Firm* — Canon U.S.A., Inc. IP Division

(57) ABSTRACT

An illumination apparatus that emits light from a light source using accumulated electric energy and that performs wireless communication with another illumination apparatus via a communication unit includes a capacitor that accumulates the electric energy used to emit light from the light source, a detection unit that detects a charge state of the capacitor, and a notification unit that performs notification indicating information indicating that the illumination apparatus is in a flash available state and notification indicating information indicating that both the illumination apparatus and the other illumination apparatus are in a flash available state in a distinguishable manner in accordance with information on the other illumination apparatus received by the communication unit and a result of the detection performed by the detection unit.

10 Claims, 7 Drawing Sheets

ILLUMINATION APPARATUS AND METHOD FOR CONTROLLING THE SAME

BACKGROUND

Field

Aspects of the present invention generally relate to an illumination apparatus that performs wireless communication with other illumination apparatuses and a method for controlling the illumination apparatus.

Description of the Related Art

In general, a camera system that performs flash photographing using a flash apparatus serving as an illumination apparatus is known. Japanese Patent Laid-Open No. 2000-89307 proposes a technique of performing flash photographing using a camera serving as an imaging apparatus, an illumination apparatus (hereinafter referred to as a "master flash") attached to the camera, and an illumination apparatus (hereinafter referred to as a "slave flash") located remotely from the camera.

A determination, however, whether the slave flash is in a charge state in which light emission is available may not be made by checking the camera or the master flash in the technique disclosed in Japanese Patent Laid-Open No. 2000-89307. Therefore, for a user to check the charge state of the remotely located slave flash, the user must see the slave flash. In a case where the charge state of the slave flash may not be checked in a position where the user operates the camera, the user is required to move to check the charge state of the slave flash, thus, resulting in additional work for the user.

SUMMARY

According to aspects of the present invention, a user can easily make a determination whether an illumination apparatus remotely located is available for light emission for flash photographing.

Aspects of the present invention provide an illumination apparatus that emits light from a light source using accumulated electric energy and that performs wireless communication with another illumination apparatus via a communication unit. The illumination apparatus includes a capacitor configured to accumulate the electric energy used to emit light from the light source, a detection unit configured to detect a charge state of the capacitor, and a notification unit configured to perform notification indicating information on a determination whether the illumination apparatus is in a charge state in which light emission is available and notification indicating information on a determination whether both the illumination apparatus and the another illumination apparatus are in a charge state in which light emission is available in accordance with information on the another illumination apparatus received by the communication unit and a result of the detection performed by the detection unit.

Further features of aspects of the present invention will become apparent from the following description of exemplary embodiments with reference to the attached drawings.

DESCRIPTION OF THE EMBODIMENTS

Figure 1:
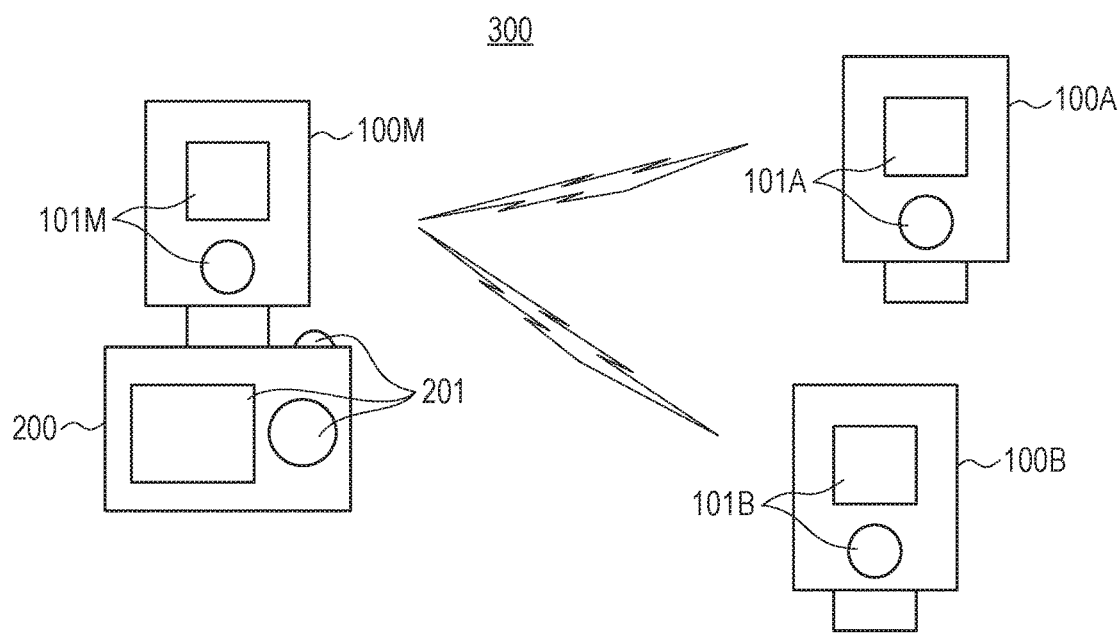
FIG. 1 is a diagram schematically illustrating a configuration of a camera system according to an embodiment of the present invention.

An embodiment of the present invention will be described in detail hereinafter with reference to the accompanying drawings. FIG. 1 is a diagram schematically illustrating a configuration of a camera system (a multi-light flash control system) 300 according to an embodiment of the present invention.

In FIG. 1, the camera system 300 includes flash apparatuses 100M, 100A, and 100B which serve as a plurality of illumination apparatuses (three illumination apparatuses in FIG. 1) which emit light to a subject and a camera 200 serving as an imaging apparatus. Note that, of the three flash apparatuses, the flash apparatus 100M is a master device which is physically connected to the camera 200 and which controls the other flash apparatuses in this embodiment. Hereinafter, the flash apparatus 100M is referred to as a "master flash".

On the other hand, the flash apparatuses 100A and 100B other than the master flash 100M are slave devices which are not physically connected to the camera 200 and which are controlled by the master flash 100M. Hereinafter, the flash apparatuses 100A and 100B are referred to as "slave flashes 100A and 100B", respectively.

The master flash 100M is capable of communicating with each of the slave flashes 100A and 100B via a wireless communication unit 105 described below in a bidirectional manner. Furthermore, the master flash 100M communicates with the camera 200 via an interface 104 described below.

The master flash 100M and the slave flashes 100A and 100B include operation display units 101M, 101A, and 101B, respectively, used to perform various settings of light emission and display.

Furthermore, the camera 200 includes an operation display unit 201 used to perform a setting of release control, a setting of switching of a camera imaging mode, display of the settings, and display of information on the master flash 100M and the slave flashes 100A and 100B.

Figure 2:
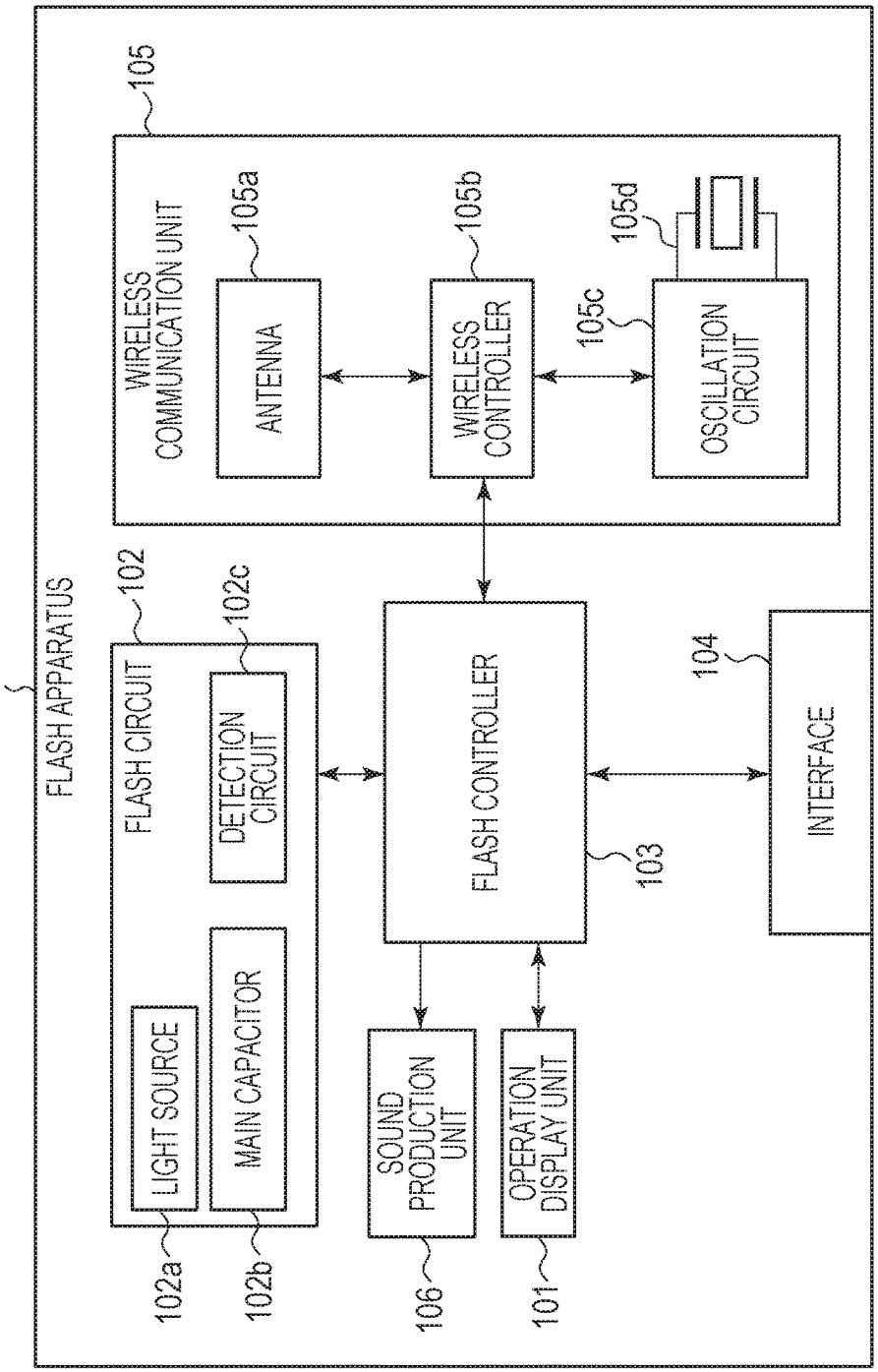
FIG. 2 is a diagram schematically illustrating a configuration of a master flash according to the embodiment of the present invention.

FIG. 2 is a diagram schematically illustrating a configuration of the master flash 100M of FIG. 1. In this embodiment, the master flash 100M and the slave flashes 100A and 100B have the same configuration, and therefore, a description of the slave flashes 100A and 100B is omitted. Note that, although an operation display unit 101 of FIG. 2 corresponds to the operation display unit 101M of FIG. 1, the reference symbol "101" is used in FIG. 2 instead of the reference symbol "101M" so that an expression similar to those of the other components is employed.

As illustrated in FIG. 2, the master flash 100M includes the operation display unit 101, a flash circuit 102, a flash controller 103, the interface 104, and the wireless communication unit 105.

The flash controller 103 includes a CPU, a ROM, a RAM, and so on and controls the entire master flash 100M. An operation instruction is issued to the flash controller 103 by operating the operation display unit 101 or an operation instruction is issued from a connected imaging apparatus, so that the master flash 100M is controlled. Furthermore, the operation display unit 101 displays various information in response to a control signal supplied from the flash controller 103.

The flash circuit 102 performs control associated with light emission, such as charge and light emission control, and causes a light source 102a to emit light when receiving a signal indicating a light emission instruction from the flash controller 103. The flash circuit 102 includes the light source 102a, such as a xenon tube, a main capacitor 102b which accumulates (charges) electric energy for light emission from the light source 102a, and a detection circuit 102c which detects a charge state of the main capacitor 102b. As for the detection circuit 102c, a circuit disclosed in Japanese Patent Laid-Open No. 2010-175622 or the like is sufficiently used, and a detailed description thereof is omitted. Furthermore, an expression of a "charge state of a flash apparatus" and an expression of "charge completion of a flash apparatus", indicate a charge state and charge completion of the main capacitor 102b included in the flash apparatus. Furthermore, in this embodiment, the charge completion of the main capacitor 102b indicates a state in which a charge voltage of the main capacitor 102b exceeds a charge voltage required for light emission from the light source 102a of a predetermined light emission amount. Specifically, the charge completion of the main capacitor 102b is not limited to a state in which the main capacitor 102b reaches a chargeable maximum voltage.

The flash circuit 102 transmits a signal indicating a charge state of the main capacitor 102b detected by the detection circuit 102c to the flash controller 103. The interface 104 is used for physical connection to the imaging apparatus. The master flash 100M communicates with the imaging apparatus physically connected through the interface 104.

The wireless communication unit 105 is used to perform wireless communication by electric waves and includes an antenna 105a, a wireless controller 105b, an oscillation circuit 105c, and a crystal oscillator 105d.

The wireless communication unit 105 may be embodied in one of two forms. That is, the wireless communication unit 105 may be incorporated in the master flash 100M or may be formed as a card which is detachable from a card slot of the master flash 100M. Although the wireless communication unit 105 is incorporated in the master flash 100M in this embodiment, any one of the forms may be employed.

The antenna 105a transmits and receives data via electric wave wireless communication and transmits data supplied from a communication partner to the wireless controller 105b. Furthermore, the antenna 105a receives data from the wireless controller 105b and transmits the data to the communication partner.

The oscillation circuit 105c rectifies a waveform of a clock signal generated by the crystal oscillator 105d connected to the oscillation circuit 105c and outputs the rectified clock signal to the circuits included in the wireless communication unit 105. The circuits may be synchronized with one another using the clock signal.

A sound production unit 106 is a speaker or the like which generates buzzer sound in response to a control signal supplied from the flash controller 103.

Figure 3:
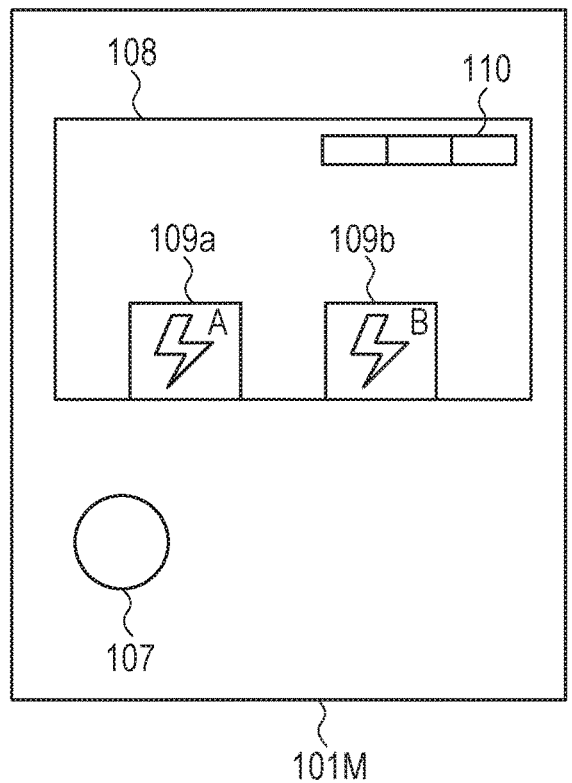
FIG. 3 is a diagram schematically illustrating a configuration of an operation display unit of the master flash according to the embodiment of the present invention.

FIG. 3 is a diagram schematically illustrating a configuration of a portion associated with display in the operation display unit 101M. The flash controller 103 controls various units. An LED lamp 107 serving as a flash unit disposed separately from the light source 102a is turned on when charge of the master flash 100M is completed and is in an off state while the charge of the master flash 100M is not completed. A liquid crystal display unit 108 displays icons 109a, 109b, and 110 as marks associated with charge states of the master flash 100M and the slave flashes 100A and 100B. The icon 109a is turned on when charge of the slave flash 100A is completed, and the icon 109b is turned on when charge of the slave flash 100B is completed. In FIG. 3, a case where the icons 109a and 109b are in an off state is illustrated. The icon 110 is a mark indicating a charge state of the master flash 100M and is a progress bar in which a display form is changed in four steps in accordance with the charge state of the master flash 100M. For example, in a case where the charge state indicates charge smaller than 30%, any block is not turned on, in a case where the charge state indicates charge equal to or larger than 30% and smaller than 60%, only a leftmost block is turned on, and in a case where the charge state indicates charge equal to or larger than 60%, the leftmost block and a middle block are turned on. Furthermore, the display form of the icon 110 is changed also depending on charge states of the slave flashes 100A and 100B, and when charge of all the master flash 100M and the slave flashes 100A and 100B is completed, the entire progress bar is turned on. Note that change of the charge state of the master flash 100M and the charge states of the slave flashes 100A and 100B indicated by the operation display unit 101M will be described later with reference to FIGS. 7 to 10. Hereinafter, the icon 110 is referred to as a "progress bar 110" where appropriate.

Figure 4:
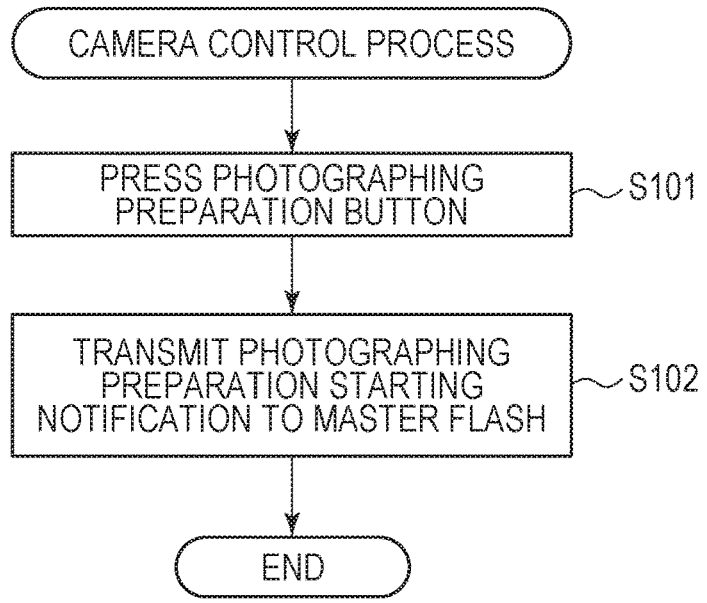
FIG. 4 is a flowchart illustrating control of a camera according to the embodiment of the present invention.

FIG. 4 is a flowchart illustrating a procedure of a camera control process executed by the camera 200 of FIG. 1. This process is executed by the CPU included in the camera 200.

In step S101, the camera 200 enters a photographing preparation start state when determining that a photographing preparation button included in the operation display unit 201 has been pressed.

In step S102, the camera 200 transmits a photographing preparation start notification to the master flash 100M via the interface 104.

Figure 5:
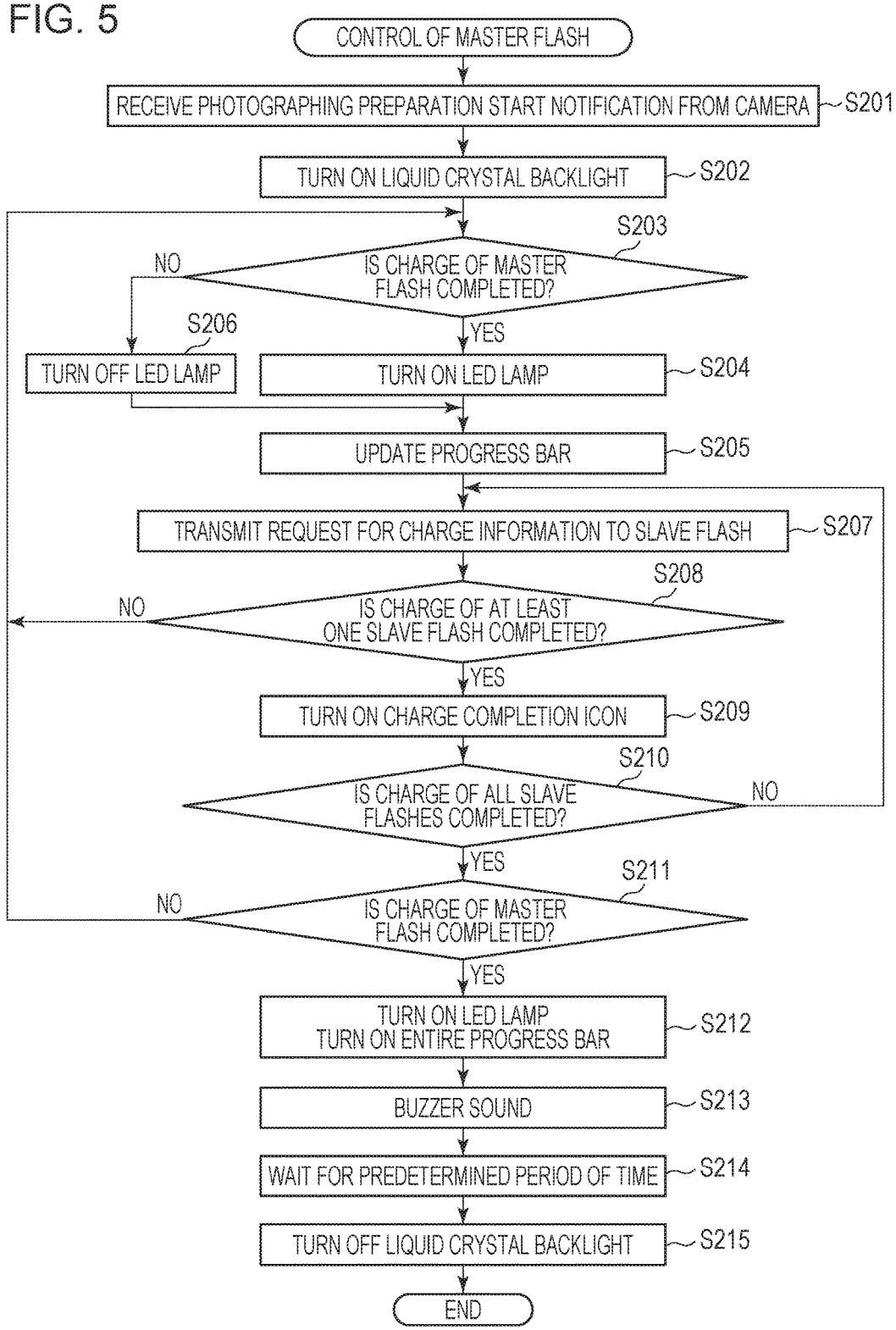
FIG. 5 is a flowchart illustrating control of the master flash according to the embodiment of the present invention.

FIG. 5 is a flowchart illustrating a procedure of a master flash control process executed by the master flash 100M of FIG. 1. This process is executed when the CPU included in the flash controller 103 of the master flash 100M reads a program stored in the ROM, the RAM, or the like.

When receiving the photographing preparation start notification indicating that photographing preparation has been started from the camera 200 in step S201, the flash controller 103 proceeds to step S202 where a backlight of the liquid crystal display unit 108 of the master flash 100M is turned on. By this, the user may easily check the icons 109a, 109b, and 110 associated with the charge states of the master flash 100M and the slave flashes 100A and 100B displayed in the liquid crystal display unit 108 of the master flash 100M.

Thereafter, the flash controller 103 proceeds to step S203 so as to detect a charge state of the master flash 100M using the detection circuit 102c of the flash circuit 102 (the flash controller 103 performs a charge completion determination). If it is determined that the charge of the master flash 100M has been completed as a result of the detection, the flash controller 103 turns on the LED lamp 107 of the master flash 100M in step S204. Furthermore, in step S204, the flash controller 103 transmits information indicating that the charge of the master flash 100M has been completed to the camera 200 via the interface 104. The camera 200 may execute control of flash photographing by receiving the information. In step S205, the flash controller 103 updates display of the progress bar 110 to a certain state and proceeds to step S207.

If the charge of the master flash 100M has not been completed in step S203, the flash controller 103 turns off the LED lamp 107 of the master flash 100M in step S206 before proceeding to step S205. In this case, in step S205, the flash controller 103 updates display of the progress bar 110 to a current charge state of the master flash 100M before proceeding to step S207.

In step S207, the flash controller 103 requests the slave flashes 100A and 100B to transmit information indicating the charge states thereof. In step S208, if the flash controller 103 determines that charge of any of the slave flashes 100A and 100B has not been completed in accordance with the information indicating the charge states of the slave flashes 100A and 100B transmitted from the slave flashes 100A and 100B and received by the flash controller 103, the process returns to step S203. If the flash controller 103 determines that charge of at least one of the slave flashes 100A and 100B has been completed in step S208, the process proceeds to step S209. In step S209, the flash controller 103 turns on at least one of the icons 109a and 109b corresponding to the slave flashes 100A and 100B which have been charged in the liquid crystal display unit 108 of the master flash 100M so that the user recognizes the charge states of the slave flashes 100A and 100B.

Figure 7:
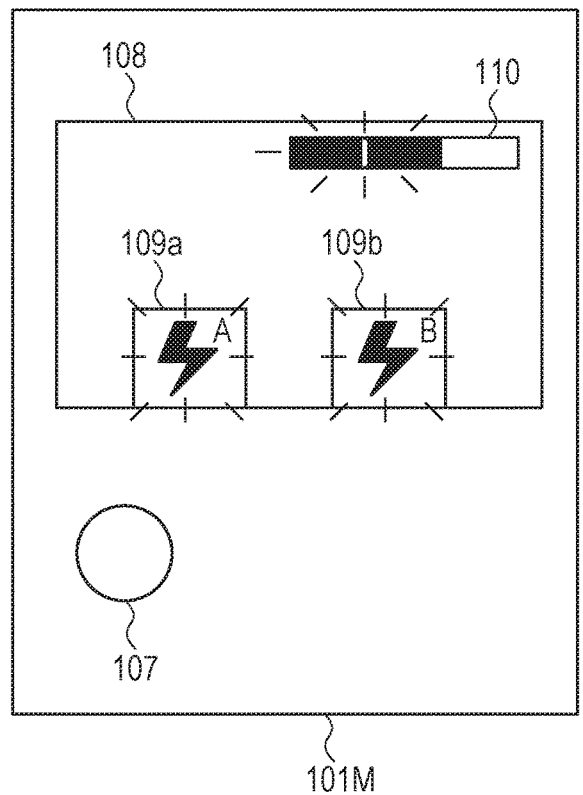
FIG. 7 is a diagram schematically illustrating a charge state of the master flash and charge states of the slave flashes displayed in the operation display unit of the master flash according to the embodiment of the present invention.

If charge of the master flash 100M has not been completed and charge of the slave flashes 100A and 100B has been completed at this time, the icons 109a and 109b are turned on while the LED lamp 107 is in an off state as illustrated in FIG. 7. Here, the progress bar 110 is displayed in a form corresponding to the charge state of the master flash 100M which is being charged, that is, the charge state indicates charge of 60% or more which represents that the charge has not been completed in FIG. 7.

Figure 8:
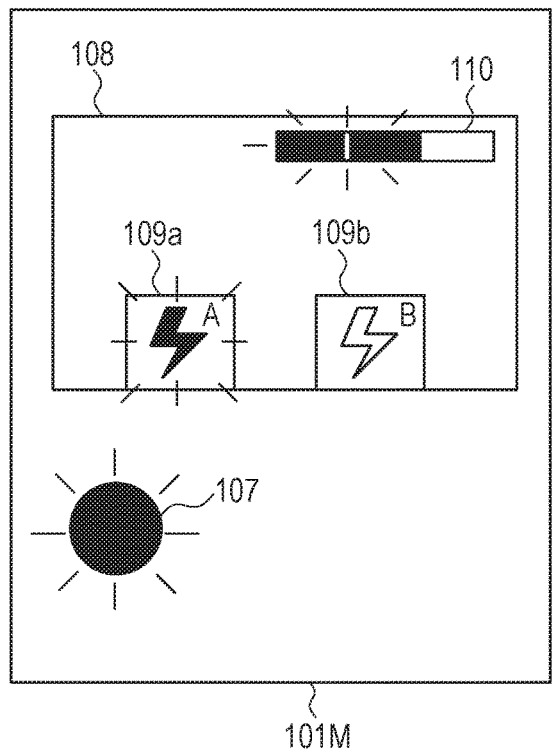
FIG. 8 is a diagram schematically illustrating a charge state of the master flash and charge states of the slave flashes displayed in the operation display unit of the master flash according to the embodiment of the present invention.

Furthermore, if charge of the master flash 100M and the slave flash 100A has been completed and charge of the slave flash 100B has not been completed at this time, the LED lamp 107 and the icon 109a are turned on while the icon 109b is in an off state. This state is illustrated in FIG. 8. In this state, the progress bar 110 is not entirely turned on even if the charge of the master flash 100M has been completed since the charge of the slave flash 100B has not been completed. In this way, the user may easily recognize whether the charge of all the master flash 100M and the slave flashes 100A and 100B has been completed in accordance with a display state of the progress bar 110.

Thereafter, the process proceeds to step S210 where the flash controller 103 determines whether information indicating that the charge has been completed has been received from all the slave flashes 100A and 100B, and when the information of at least one of the slave flashes 100A and 100B has not been received, the process returns to step S207. Here, if the request for the information indicating the charge states of the slave flashes 100A and 100B is to be transmitted again in step S207, the flash controller 103 may transmit a request for information indicating the charge state only to one of the slave flashes 100A and 100B which has not transmitted the information indicating that the charge has been completed to the flash controller 103.

Figure 9:
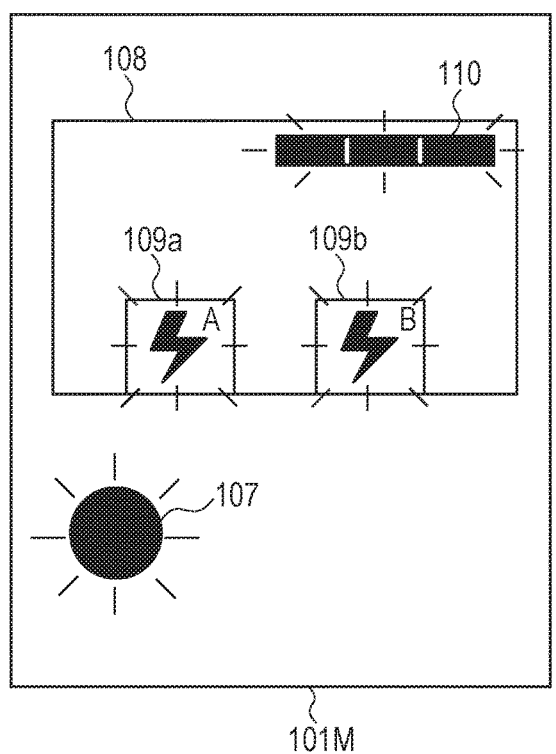
FIG. 9 is a diagram schematically illustrating a charge state of the master flash and charge states of the slave flashes displayed in the operation display unit of the master flash according to the embodiment of the present invention.

If the information indicating that the charge has been completed is received from all the slave flashes 100A and 100B, the process proceeds to step S211 where the flash controller 103 determines whether the charge of the master flash 100M has been completed. If the charge of the master flash 100M has not been completed, the process returns to step S203. If the charge of the master flash 100M has been completed, the process proceeds to step S212 where the entire progress bar 110 is turned on in the liquid crystal display unit 108 since the charge of all the master flash 100M and the slave flashes 100A and 100B has been completed. If the LED lamp 107 is in an off state, the LED lamp 107 is turned on at this timing. This state is illustrated in FIG. 9.

Thereafter, the process proceeds to step S213 where the flash controller 103 causes the sound production unit 106 to generate buzzer sound for a certain period of time. The buzzer sound notifies the user of the completion of the charge of all the master flash 100M and the slave flashes 100A and 100B, and a determination as to whether the buzzer sound is to be generated may be made by operating the operation display unit 101M. When the buzzer sound is generated, the flash controller 103 waits until a certain period of time elapses in step S214 after the buzzer sound is generated. After the certain period of time has elapsed, the process proceeds to step S215 where the backlight of the liquid crystal display unit 108 of the master flash 100M is turned off. By this, electric power consumed in a turn-on state of the backlight may be suppressed.

Figure 6:
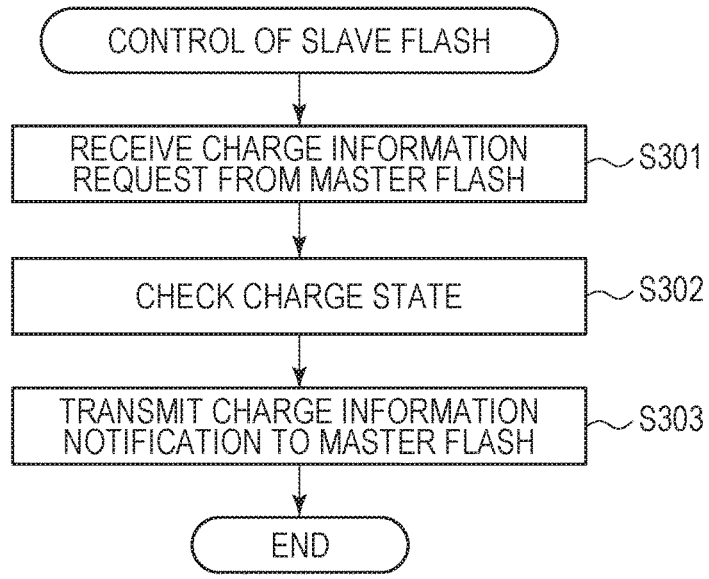
FIG. 6 is a flowchart illustrating control of slave flashes according to the embodiment of the present invention.

FIG. 6 is a flowchart illustrating a procedure of a charge completion check process executed by each of the slave flashes 100A and 100B of FIG. 1. This process is executed when a CPU included in a flash controller 103 of the slave flash 100A or the slave flash 100B reads a program stored in a ROM, a RAM, or the like.

When receiving a charge completion information request notification from the master flash 100M in step S301, the flash controller 103 detects a charge state using a detection circuit 102c of a flash circuit 102 in step S302 (charge completion check).

In step S303, the flash controller 103 transmits information indicating the charge state corresponding to a signal indicating the charge state supplied from the flash circuit 102 to the master flash 100M.

As described above, the user may easily recognize the completion of the charge of the master flash 100M if the LED lamp 107 of the master flash 100M indicating the information of the state of the master flash 100M is in an on state. Therefore, the user checks only a state of the LED lamp 107 if the user desires to perform flash photographing by emitting light only from the master flash 100M even though the charge of the slave flashes 100A and 100B has not been completed. Accordingly, the user may not miss a shot.

Furthermore, the user may easily recognize a degree of the charge of the master flash 100M being charged by checking the progress bar 110 displayed in the liquid crystal display unit 108 of the master flash 100M. Therefore, if the user requires an approximate period of time until charge of the master flash 100M is completed, the user checks a state of the progress bar 110.

Furthermore, the user may easily recognize whether the charge of all the master flash 100M and the slave flashes 100A and 100B has been completed by checking the progress bar 110 displayed in the liquid crystal display unit 108 of the master flash 100M. Therefore, if the user desires to perform flash photographing by emitting light from all of the master flash 100M and the slave flashes 100A and 100B, the user only checks a state of the progress bar 110.

Furthermore, the user may easily recognize at least one of the slave flashes 100A and 100B in which the charge has been completed by checking the icons 109a and 109b displayed in the liquid crystal display unit 108 of the master flash 100M which indicate information on states of the other illumination apparatuses. Accordingly, if the user desires to recognize at least one of the slave flashes 100A and 100B in which the charge thereof has not been completed, the user only checks the states of the icons 109a and 109b.

However, in a case of a master flash which is capable of controlling a large number of slave flashes, it is difficult to provide different icons for different charge states of the slave flashes as described in the embodiment due to restriction of a size of the liquid crystal display unit 108. Therefore, instead of different icons for different charge states of all the slave flashes, the slave flashes may be divided into some groups and different icons may be provided for the different groups. A technique of dividing a plurality of slave flashes into some groups and performing light emission control by a master flash for individual groups is described in Japanese Patent Laid-Open No. 2013-160788, for example, and therefore, a detailed description thereof is omitted. In a case where 10 slave flashes are divided into three groups A, B, and C, the group A including six slave flashes, the group B including three slave flashes, and the group C including one slave flash, for example, if charge of all the six slave flashes which belong to the group A has been completed, an icon corresponding to the group A is turned on. Similarly, in a case where charge of the three slave flashes which belong to the group B has been completed, an icon corresponding to the group B is turned on, and in a case where charge of the one slave flash which belongs to the group C has been completed, an icon corresponding to the group C is turned on. Since the slave flashes are divided into some groups and charge states of the groups are displayed by respective icons as described above, information on the charge states of the slave flashes may be efficiently displayed in a limited space.

Figure 10:
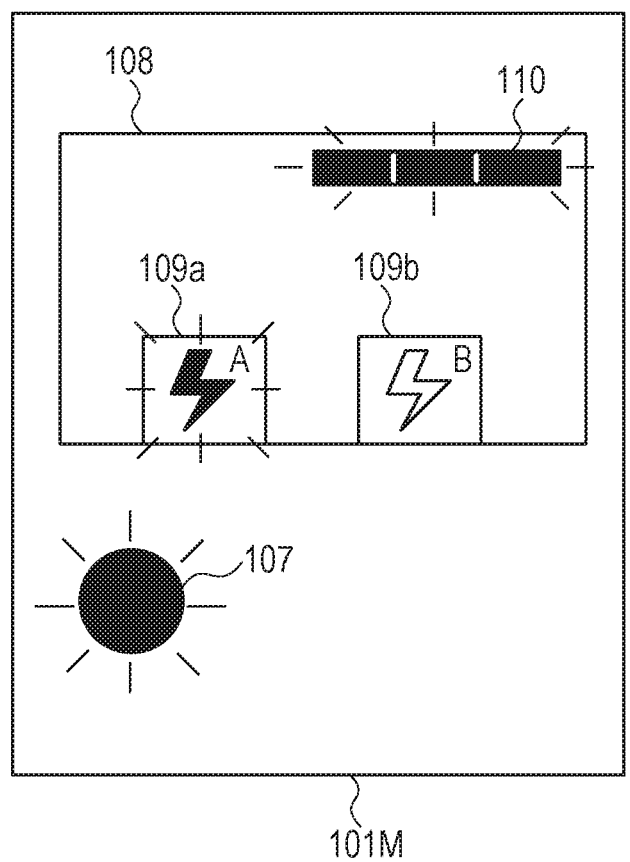
FIG. 10 is a diagram schematically illustrating a charge state of the master flash and charge states of the slave flashes displayed in the operation display unit of the master flash according to the embodiment of the present invention.

Furthermore, in a case where the number of icons for displaying charge states of slave flashes is determined in advance, the number of slave flashes may be smaller than the number of icons in some cases. In a case where the number of icons displaying charge states of slave flashes is 2 and the number of slave flashes is 1, the icon 109b is not turned on as illustrated in FIG. 10. Therefore, the user may not determine whether charge of all master flash and slave flashes has been completed by only seeing the LED lamp 107 and the icons 109a and 109b. Also in this case, if the charge of all the master flash and the slave flashes has been completed, the entire progress bar 110 is turned on as illustrated in FIG. 10, and therefore, the user may reliably recognize charge states of the master flash and the slave flashes.

Moreover, the display form of the charge states of the master flash and the slave flashes displayed for the user is not limited to the example of the embodiment described above, and types of mark to be displayed, the number of marks to be displayed, and positions of marks to be displayed may be arbitrarily set. Furthermore, the flash unit which represents the charge state of the master flash is not limited to the LED lamp 107.

Furthermore, although the example of the camera system which controls the slave flashes using the illumination apparatus physically connected to the imaging apparatus as a master device is described in the embodiment described above, a camera system which controls slave flashes using an imaging apparatus as a master device may be employed. In this case, a process the same as that of the master flash in the embodiment described above may be performed by the imaging apparatus. Here, the master flash may perform wireless communication with the slave flashes using a wireless communication function of the imaging apparatus, and the charge state of the master flash may be replaced by a charge state of a built-in flash of the imaging apparatus. Furthermore, the master flash may communicate with the slave flashes using a communication device physically connected to the imaging apparatus, and the charge state of the built-in flash of the imaging apparatus and charge states of the slave flashes may be displayed in the imaging apparatus.

Moreover, in the embodiment described above, the charge state of the master flash is displayed using the LED lamp 107, and the charge states of the slave flashes and the completion of the charge of all the master flash and the slave flashes are displayed using the liquid crystal display unit 108. However, the methods for displaying the charge states, etc. are not limited to these methods. The charge state of the master flash may be displayed using the liquid crystal display unit 108, for example. Moreover, the charge state of the master flash, the charge states of the slave flashes, and the completion of the charge of all the master flash and the slave flashes may be displayed using different members. That is, any display method may be used as long as information indicating that the master flash is in a flash available state, information indicating that the slave flashes are in a flash available state, and information indicating that all the master flash and the slave flashes are in a flash available state may be distinguished from one another.

Furthermore, although the example of the camera system including the master flash and the slave flashes which are the same type is described, the type of the master flash and the type of the slave flashes may be different from each other as long as the slave flashes may communicate with the master flash in a bidirectional manner.

An embodiment of the present invention is described above. Aspects of the present invention are not limited to the foregoing embodiment and various modifications and changes may be made within the scope of the invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While aspects of the present invention have been described with reference to exemplary embodiments, it is to be understood that the aspects of the invention are not limited to the disclosed exemplary embodiments. The scope of the following claims is to be accorded the broadest interpretation so as to encompass all such modifications and equivalent structures and functions.

This application claims the benefit of Japanese Patent Application No. 2015-136441, filed Jul. 7, 2015, which is hereby incorporated by reference herein in its entirety.

What is claimed is:

1. An illumination apparatus that emits light from a light source using accumulated electric energy and that performs wireless communication with another illumination apparatus via a communication unit, the illumination apparatus comprising:
 a capacitor configured to accumulate the electric energy used to emit light from the light source;
 a detection unit configured to detect a charge state of the capacitor; and
 a notification unit configured to perform notification indicating information on a determination whether the illumination apparatus is in a charge state in which light emission is available and notification indicating information on a determination whether both the illumination apparatus and the another illumination apparatus are in a charge state in which light emission is available in accordance with information on the another illumination apparatus received by the communication unit and a result of the detection performed by the detection unit,
 wherein the notification unit includes a display unit that displays predetermined marks when both the illumination apparatus and the another illumination apparatus are brought into a charge state in which light emission is available.

2. The illumination apparatus according to claim 1, wherein the notification unit performs notification indicating information on a determination whether the another illumination apparatus is in a charge state in which light emission is available and notification indicating information on a determination whether both the illumination apparatus and the another illumination apparatus are in a charge state in which light emission is available.

3. The illumination apparatus according to claim 1, wherein
 the communication unit communicates with a plurality of other illumination apparatuses, and
 the notification unit performs notification indicating information indicating that both the illumination apparatus and the plurality of other illumination apparatuses are in a charge state in which light emission is available when the illumination apparatus and all the plurality of other illumination apparatuses are in a charge state in which light emission is available.

4. The illumination apparatus according to claim 1, wherein the notification unit includes a flash unit that is different from the light source and that is turned on when the illumination apparatus is brought into a charge state in which light emission is available.

5. The illumination apparatus according to claim 1, wherein wireless communication with the another illumination apparatus is performed using electric waves via the communication unit.

6. An illumination apparatus that emits light from a light source using accumulated electric energy and that performs wireless communication with another illumination apparatus via a communication unit, the illumination apparatus comprising:
 a capacitor configured to accumulate the electric energy used to emit light from the light source;
 a detection unit configured to detect a charge state of the capacitor; and
 a notification unit configured to perform notification indicating information on a determination whether the illumination apparatus is in a charge state in which light emission is available and notification indicating information on a determination whether both the illumination apparatus and the another illumination apparatus are in a charge state in which light emission is available in accordance with information on the another illumination apparatus received by the communication unit and a result of the detection performed by the detection unit,
 wherein the notification unit includes a sound production unit that generates sound when both the illumination apparatus and the another illumination apparatus are brought into a charge state in which light emission is available.

7. An illumination apparatus that emits light from a light source using accumulated electric energy and that performs communication with another illumination apparatus via a communication unit, the illumination apparatus comprising:
 a capacitor configured to accumulate the electric energy used to emit light from the light source;
 a detection unit configured to detect a charge state of the capacitor; and
 a notification unit configured to perform notification indicating information on a determination whether the illumination apparatus is in a charge state in which light emission is available and notification indicating information on a determination whether the another illumination apparatus is in a charge state in which light emission is available in accordance with information on the another illumination apparatus received by the communication unit and a result of the detection performed by the detection unit,
 wherein the notification unit includes a light emission unit that is different from the light source and a display unit, and
 wherein the light emission unit is turned on when the illumination apparatus is brought into a charge state in which light emission is available, whereas a predetermined mark is displayed on the display unit when the another illumination apparatus is brought into a charge state in which light emission is available.

8. The illumination apparatus according to claim 7,
wherein the communication unit that communicates with a plurality of other illumination apparatuses that are divided into groups, and
the notification unit performs notification indicating information on a determination whether the plurality of other illumination apparatuses is in a charge state in which light emission is available.

9. A method for controlling an illumination apparatus that emits light from a light source using accumulated electric energy and that performs wireless communication with another illumination apparatus via a communication unit, the control method comprising:
  detecting a charge state of a capacitor that accumulates the electric energy used to emit light from the light source;
  receiving information on the another illumination apparatus via the communication unit; and
  performing notification indicating information on a determination whether the illumination apparatus is in a charge state in which light emission is available and notification indicating information on a determination whether both the illumination apparatus and the another illumination apparatus are in a charge state in which light emission is available in accordance with the received information on the another illumination apparatus and a result of the detection
  wherein the notification includes displaying predetermined marks by a display unit when both the illumination apparatus and the another illumination apparatus are brought into a charge state in which light emission is available.

10. A method for controlling an illumination apparatus that emits light from a light source using accumulated electric energy and that performs communication with another illumination apparatus via a communication unit, the control method comprising:
  detecting a charge state of a capacitor that accumulates the electric energy used to emit light from the light source;
  receiving information on the another illumination apparatus via the communication unit; and
  performing notification indicating information on a determination whether the illumination apparatus is in a charge state in which light emission is available and notification indicating information on a determination whether the another illumination apparatus is in a charge state in which light emission is available in accordance with the received information on the another illumination apparatus and a result of the detection,
  wherein the notification includes turning on of a light emission unit that is different from the light source when the illumination apparatus is brought into a charge state in which light emission is available and displaying a predetermined mark by a display unit when the another illumination apparatus is brought into a charge state in which light emission is available.

* * * * *